United States Patent
Niles

(10) Patent No.: US 10,662,689 B2
(45) Date of Patent: May 26, 2020

(54) MOVING MACHINERY SAFETY

(71) Applicant: Rail Components (UK) Limited, Doncaster (GB)

(72) Inventor: Paul Niles, Doncaster (GB)

(73) Assignee: Rail Components (UK) Limited, Doncaster (GB)

( * ) Notice: Subject to any disclaimer, the term of this patent is extended or adjusted under 35 U.S.C. 154(b) by 177 days.

(21) Appl. No.: 15/672,098

(22) Filed: Aug. 8, 2017

(65) Prior Publication Data
US 2018/0044140 A1 Feb. 15, 2018

(30) Foreign Application Priority Data

Aug. 9, 2016 (GB) ...................................... 1613700

(51) Int. Cl.
| | | |
|---|---|---|
| *E05D 15/06* | (2006.01) |
| *B66B 29/00* | (2006.01) |
| *E06B 9/06* | (2006.01) |
| *F16G 11/12* | (2006.01) |

(52) U.S. Cl.
CPC .......... *E05D 15/0621* (2013.01); *B66B 29/00* (2013.01); *E06B 9/0692* (2013.01); *F16G 11/12* (2013.01); *E05Y 2900/608* (2013.01)

(58) Field of Classification Search
CPC ..... E05D 15/0621; B66B 29/00; F16G 11/12; B65G 2207/40
See application file for complete search history.

(56) References Cited

U.S. PATENT DOCUMENTS

| | | | | |
|---|---|---|---|---|
| 583,235 | A * | 5/1897 | McCormick | E06B 3/481 160/159 |
| 4,006,768 | A * | 2/1977 | Horgan, Jr. | E06B 9/063 160/136 |
| 5,535,803 | A * | 7/1996 | Pretorius | E06B 9/063 160/136 |
| 5,573,125 | A * | 11/1996 | Denny | A47B 96/00 160/84.01 |

(Continued)

FOREIGN PATENT DOCUMENTS

| | | |
|---|---|---|
| JP | H04140298 | 5/1992 |
| JP | H0826645 | 1/1996 |

OTHER PUBLICATIONS

Machine-generated English-language translation of the abstract of JP H0826645, downloaded from Espacenet.com on Dec. 15, 2017.

(Continued)

*Primary Examiner* — Katherine W Mitchell
*Assistant Examiner* — Abe Massad
(74) *Attorney, Agent, or Firm* — DASCENZO Intellectual Property Law, P.C.

(57) ABSTRACT

Apparatus and method for providing a safety barrier proximate to a hazardous region such as open support truss work of an escalator, comprising an extendable barrier member such as a chainmail panel, slidable on at least one support element securable to a support framework proximate to the hazardous region; wherein the extendable barrier member is movable between a closed and an open position allowing access to the hazardous region to allow for maintenance, and a closed position in which the barrier member provides a barrier over an opening of the support framework.

16 Claims, 16 Drawing Sheets

(56) References Cited

U.S. PATENT DOCUMENTS

| | | | | |
|---|---|---|---|---|
| 6,619,490 B2* | 9/2003 | Calleja | ............... | A47F 5/01 |
| | | | | 211/180 |
| 6,938,785 B2* | 9/2005 | Denny | ............... | A47F 13/00 |
| | | | | 211/183 |
| 7,014,053 B2* | 3/2006 | Calleja | ............... | A47F 5/01 |
| | | | | 182/138 |
| 2012/0031001 A1* | 2/2012 | Dorr | ............... | E05B 65/0811 |
| | | | | 49/54 |

OTHER PUBLICATIONS

Machine-generated English-language translation of the abstract of JP H04140298, downloaded from Espacenet.com on Dec. 15, 2017.

\* cited by examiner

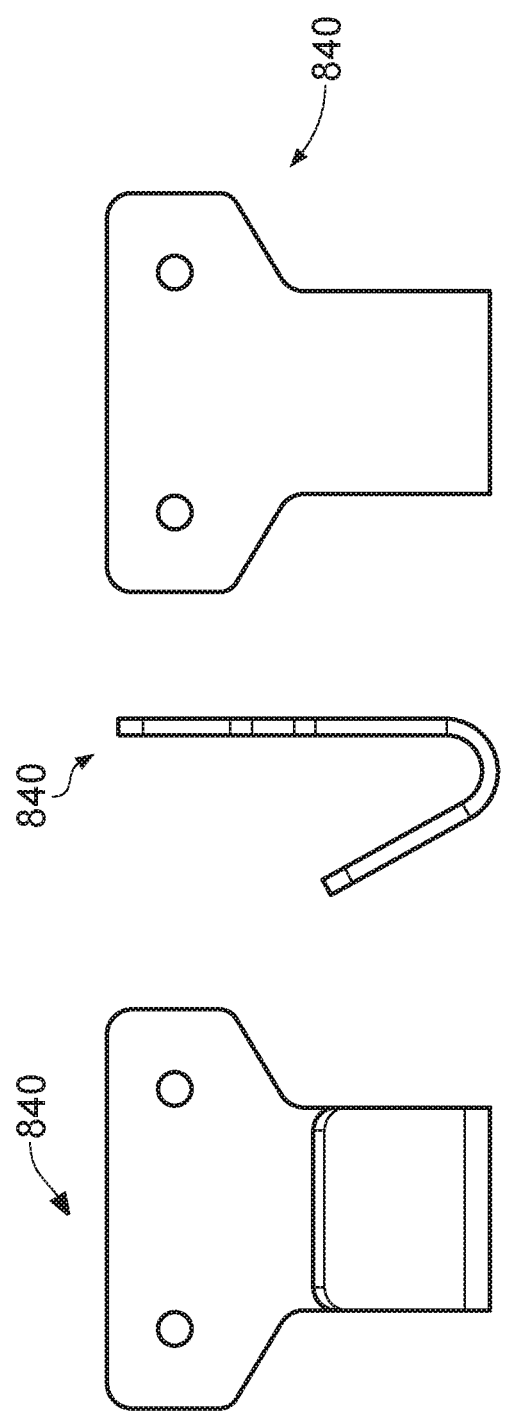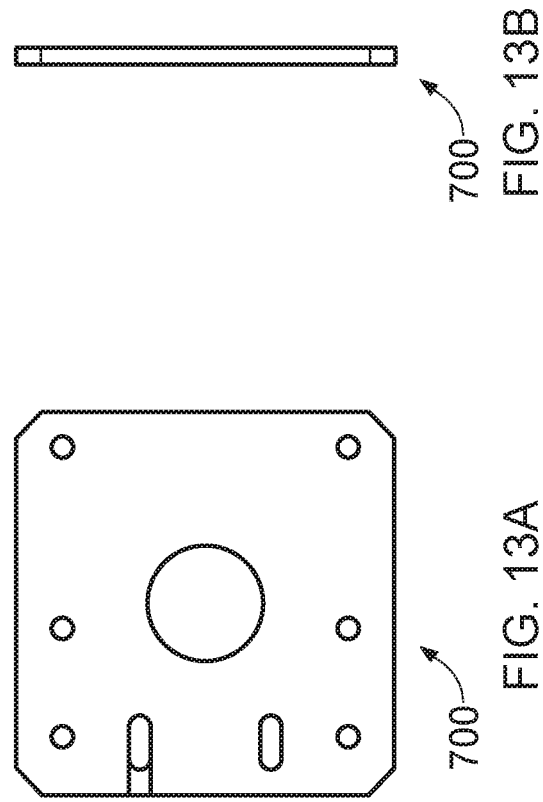

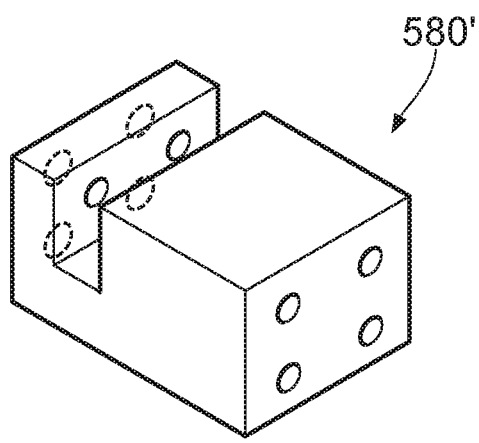
FIG. 15A
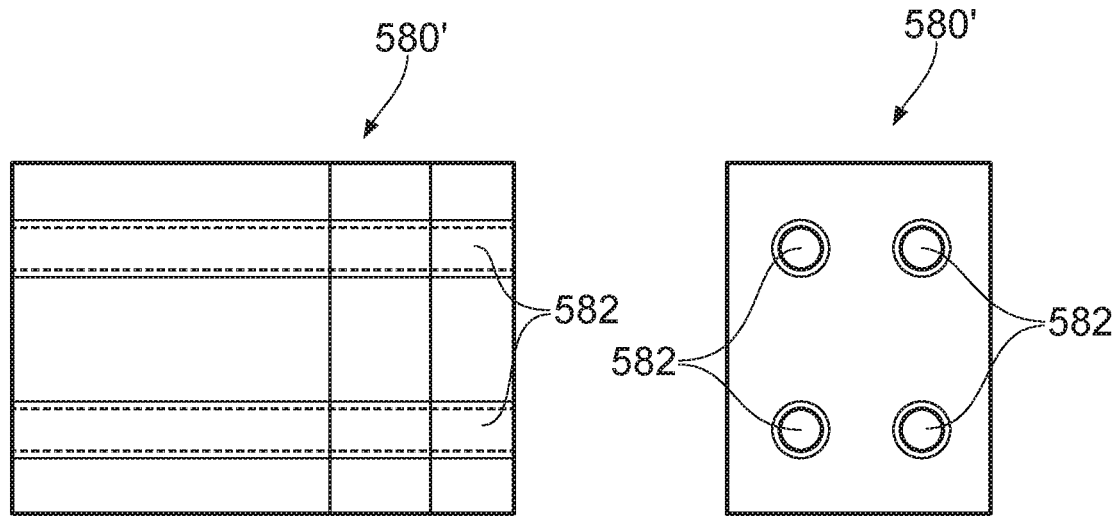
FIG. 15B
FIG. 15C

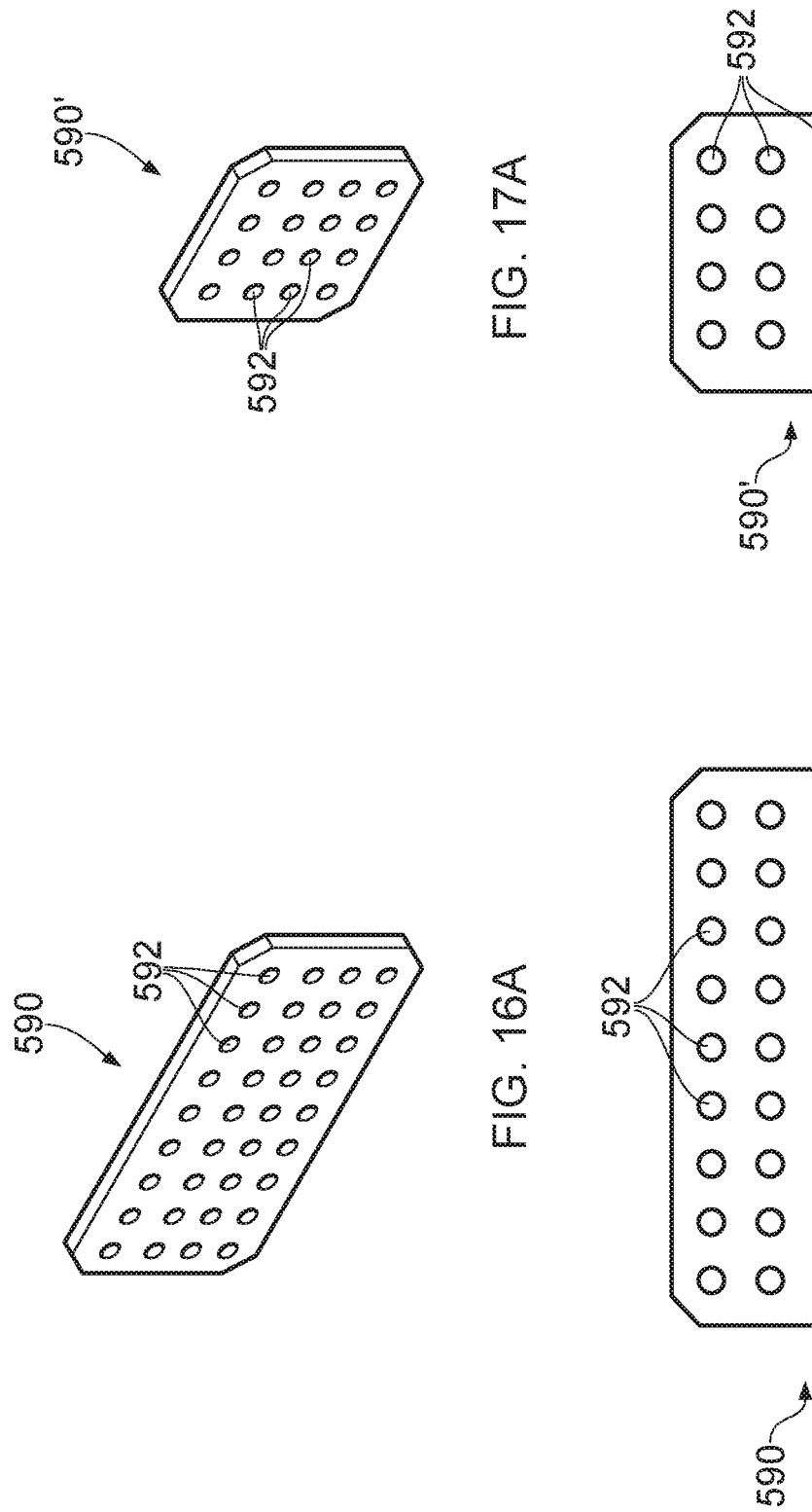

MOVING MACHINERY SAFETY

FIELD OF THE INVENTION

The present invention relates to providing a safe working environment proximate to heavy machinery which could otherwise be a danger to human operators.

BACKGROUND OF THE INVENTION

It is known from time to time that human operators such as maintenance engineers or the like need to access areas near machinery which can be hazardous. For example where heavy machinery has moving parts a human operator must be protected to avoid falling into the moving parts or to accidentally locate a limb in a hazardous region. The problem is exacerbated by the fact that certain maintenance operations can take prolonged periods of time when concentration levels can wane. Conventionally protective measures have merely focussed on defining hazardous regions and clearly demarcating regions where an operator can or cannot go. However since maintenance can take place over prolonged periods of time when concentration levels can drop such mere demarcation has sadly on occasion proved inadequate.

Escalators in public or private areas are an example of heavy machinery which can provide hazardous environments to operators.

The escalators along with their supporting truss framework are situated and hidden below ground or floor levels where the public go about their daily business. Escalators are often arranged in pairs or multiples in a side by side arrangement. The gap between escalators in these chambers is at best the width of an average operative with many being much narrower.

Escalators are very powerful machines that run at full speed and torque for the majority of each day and every day of the week with only minimum non-operational time permitted. Access to these areas is rigorously controlled with strictly no permitted access allowed to the areas between escalators whilst one or more are operating.

As a consequence conventionally the only time unrestricted access is permitted is during the hours the escalator is out of action. For example, at a station, there is typically a maintenance window of between 01:00 hrs and 05:00, after closure, and prior to the station reopening to the public. Repairing an escalator during this window of opportunity is often not feasible and often results in the machine remaining non-operational for much longer than desired.

Also many other scheduled events need to be carried out on the escalator during these short available night periods such as routine maintenance and cleaning operations. With the advent of 24/7 services in certain locations such as is anticipated with the London Night Tube, where certain tube lines and stations will operate on a 24 hour basis, the time slots currently available will no longer be an option.

SUMMARY OF THE INVENTION

If engineers cannot gain safe access to undertake repairs on escalators that have broken down until such time that the adjacent machines have been taken out of operation then the downtime of the machine needing attention will be much longer and thus create greater commuter disruption.

It is an aim of the present invention to at least partly mitigate the above-mentioned problems. It is an aim of certain embodiments of the present invention to provide a safety mechanism for human operators such as maintenance engineers or the like which can be readily put in place during a limited time scale and which will thereafter enable an operator to carry out maintenance operations in a region in an entirely safe environment.

It is an aim of certain embodiments of the present invention to provide a safety mechanism which helps clearly demarcate safe and dangerous regions within a work space.

It is an aim of certain embodiments of the present invention to provide a safety mechanism which restricts human operator movement to an extent whereby even if a whole or part of a human operator tends to move towards a hazardous region the safety mechanism will prevent injury.

Certain embodiments of the present invention allow work of an emergency or non-emergency nature to be carried out during a shift pattern. Certain embodiments of the present invention enable maintenance to be carried out on an escalator whilst adjacent escalators remain operational in a safe and secure manner.

According to a first embodiment of the invention there is provided apparatus for providing a safety barrier proximate to a hazardous region, comprising: an extendable barrier member slidable on at least one support element securable to a support framework proximate to a hazardous region; wherein the extendable barrier member is movable between a closed position and an open position and wherein, in the closed position, the extendable barrier member provides a barrier over a respective opening of the support framework.

The extendable barrier member may comprise one or more fireproof rigid elements. The extendable barrier member may comprise a web of chainmail.

The at least one support element may comprise a wire rope supported on a plurality of wire supports. The wire rope is supported in a groove provided in each of the wire supports. The wire rope may comprise a pre-measured length of wire rope, each end of which is attached by wire attachment means to a tensioning element.

The wire attachment means may comprise attachment studs and the tensioning element comprises a turnbuckle. In an alternative embodiment, the tensioning element could comprise a clutched tensioning unit and the wire attachment means could comprise apertures in the clutched tensioning unit arranged to receive and grip the ends of the wire rope.

The apparatus may further comprise a pull bar attached to a moveable end of the panel extendable barrier member. The pull bar may further comprise pull bar attachment means to attach the pull bar to the support framework when the panel is in the closed position. The pull bar attachment means may comprise hooks or clips which are engageable with cooperating elements of the support framework to maintain the curtain in the closed position.

According to a further aspect of the invention there is provided a method of providing a safety barrier member over an opening in a support framework of machinery; comprising steps of:
a) measuring the opening to determine a required size of barrier element;
b) mounting a pull bar to an end of an extendable barrier member of the required size;
c) cutting a length of wire rope to a predetermined length;
d) attaching wire attachment means to each end of the wire rope and fitting a tensioning means between the wire attachment means;
e) assembling the wire rope, wire attachment means and tensioning means loosely over supports elements provided on the support framework;

f) using the tensioning means to tension the wire rope, thereby to create a wire rope frame;

g) hanging the extendable barrier over the wire rope frame;

h) pulling the pull bar thereby to extend the barrier member across the opening in the support framework thereby to cover the opening with the barrier member; and i) attaching, via pull bar attachment means, the pull bar to the tensioned wire rope.

The support elements comprise a plurality of stud stands which are secured to the framework, a plurality of threaded dowels, and a plurality of wire supports; wherein a threaded dowel is inserted into each stud stand such that a section of the threaded dowel projects from the end of the stud stand; and wherein step e) comprises threading a wire support onto each projecting end of a threaded dowel.

One or more dowel spacer pieces may be threaded onto the projecting end of the threaded dowel before the wire support.

The method may further comprise securing lockable carabiner clips, which have been pre-installed on the barrier element, to a top portion of the wire rope frame. The method may further comprise, after step i), releasably locking the pull bar to the tensioned wire rope.

The method may further comprise fitting one or more mounting offset blocks, which may be positioned between the support framework and a wire support, to provide an increased separation between the support framework and the barrier member, and/or to enable a symmetrical wire frame to be created. The mounting offset blocks may be clamped to the support framework with set screws, and a mounting plate may be mounted to an outer face of the mounting offset block. The mounting plates may comprise multiple apertures in which at least a part of a wire support can be received. As an alternative to the mounting plates, a slotted adjustment bar may be mounted to the outer face of the mounting offset blocks. The slotted adjustment bar may include an elongated slot in which at least a part of a wire support can be received.

According to a further aspect of the present invention there is provided apparatus for providing a safety barrier proximate to a hazardous region, comprising: an extendable barrier member slidable on at least one support element securable to a support framework proximate to a hazardous region; wherein the extendable barrier member is movable between a closed position and an open position and that in the closed position the extendable barrier member provides a barrier over a respective opening between spaced apart struts of the support framework.

In certain embodiments, the extendable barrier member comprises a web of chainmail. In certain embodiments, the extendable barrier member comprises a plurality of fireproof rigid elements. In certain embodiments, the fireproof rigid elements are loosely secured together.

In certain embodiments, the extendable barrier member comprises an array of elongate plate members secured along their longitudinal length to concertina between a compressed arrangement in which an opening is substantially exposed and an extended arrangement in which an opening is substantially covered.

In a further aspect of the present invention, there is provided a method for providing a safety barrier proximate to a hazardous region, comprising: sliding a flexible sheet member, on at least one support secured to a support framework proximate to a hazardous region, from an open position in which an aperture between struts of the support framework is open, to a closed position in which the flexible sheet member extends like a flexible panel over the respective opening to thereby prevent unauthorised ingress between the struts.

In a further aspect of the present invention, there is provided a method of isolating a region of potentially hazardous equipment from a human operator, comprising the steps of: a) determining at least one region of functioning machinery proximate to a region of defective machinery; and b) for the at least one region, sliding a barrier member, supported on a framework portion of the functioning equipment, from an open position to a closed position thereby providing a barrier member between the functioning machinery and said region of defective machinery.

In certain embodiments, the step of sliding a barrier member comprises sliding a chainmail sheet member, supported via the framework, from an open position in which the sheet is folded or rolled, to a closed position.

In certain embodiments, the method further comprises sliding the chainmail sheet member along a tight wire element supported by the framework portion of the functioning equipment.

In certain embodiments, the step of sliding a barrier member comprises sliding a plurality of plate elements from a folded relationship to an extended no longer concertinaed relationship.

In a further aspect of the present invention, there is provided apparatus for providing a safety barrier across at least one opening between struts of a supporting framework for an escalator, comprising: at least one support element on a supporting framework of an escalator; and a flexible chainmail curtain member slidable along the support element from an open position, in which an aperture in the framework is uncovered, to a closed position in which the chainmail curtain member extends across the opening to prevent motion of a human body or part of a human body through the opening.

In a further aspect of the present invention, there is provided a method of servicing a defective escalator, comprising the steps of: a) deactivating a defective escalator; b) for at least one remaining escalator proximate to the defective escalator, providing a barrier across at least one aperture in a support framework via a respective flexible barrier member by sliding the flexible barrier member from an open position to a closed position thereby isolating the functioning machinery from a work zone.

Aptly, the invention allows work of a non-emergency nature to be carried out during any shift pattern available if desired.

Aptly the easily demountable safety panels can be replaced quickly if damaged with a new made to measure replacement. Aptly swift replacement is made possible by retaining the survey data of every panel installed so the new replacement can be brought to site ready for installing once the old panel is removed.

According to a still further aspect of the present invention there is provided a woven stainless steel chainmail mesh panel sized to fit measured openings present on the escalator truss work which conventionally allow unrestricted access to the very dangerous moving parts of the escalator when in use.

Aptly the panel is suspended or otherwise supported on three of its four sides to a pre-tensioned stainless steel wire rope which forms the framing around the perimeter of the escalator truss opening. Aptly the method of suspension from the rope frame is by the use of stainless steel screw lockable carabiner clips.

Aptly a stainless steel end plate is installed on the panel at the desired opening end which can be hooked over the end tensioned wire rope for retention and locked in place with the integral lockable cam lock situations in the centre of the end plate. Aptly when access is needed the cam lock on the end plate is released, the hooks of the end plate disengaged from the tension rope and the full depth of the curtain panel can then be retracted.

Aptly once fully retracted the curtain can be retained by Velcro™ tie backs or other such securing elements fixed to the fixed vertical end of the framework. Aptly once work has been completed the mesh panel can be released from the ties and pulled back to its closed position and re-locked as before.

Certain embodiments of the present invention thus provide safety curtaining comprising a chainmail steel curtain panel suspended by means of carabiner clips to a tensioned wire/bar framing installed on truss support framework being in front of escalators or other heavy machinery.

Certain embodiments of the present invention provide metal curtaining which can be bespoke and sized to fit all desired situations and locations.

Certain embodiments of the present invention provide a safe working environment between operational escalators enabling engineers and others to access working areas conventionally prohibited whilst the escalators are in use. Aptly the safety equipment can be scaled and adapted to suit all situations and locations as desired.

Certain embodiments of the present invention solve the problem of escalator machine availability outside a non-operational hours window for engineers and others to access in a safe approved environment enabling emergency/planned work to be undertaken.

BRIEF DESCRIPTION OF THE DRAWINGS

Certain embodiments of the present invention will now be described hereinafter, by way of example only, with reference to the accompanying drawings in which like reference numerals refer to like parts and in which:

FIG. 12A is a front view of a curtain hook; FIG. 12B is a side view of the curtain hook of FIG. 12A; FIG. 12C is a back view of the curtain hook of FIG. 12A;

FIG. 13A is a front view of centre plate/cam lock of a pull bar; FIG. 13B is a side view of the centre plate/cam lock of FIG. 13A;

FIG. 15A is an isometric view of an alternative mounting offset block, and FIG. 15B is a top view of the mounting offset block of FIG. 15A; FIG. 15C is a side view of the mounting offset block of FIG. 15A;

FIG. 16A is an isometric view of a mounting plate, and FIG. 16B is a front view of the mounting plate of FIG. 16A;

FIG. 17A is an isometric view of an alternative mounting plate, and FIG. 17B is a front view of the alternative mounting plate of FIG. 17A;

DETAILED DESCRIPTION OF THE INVENTION

Figure 1A:
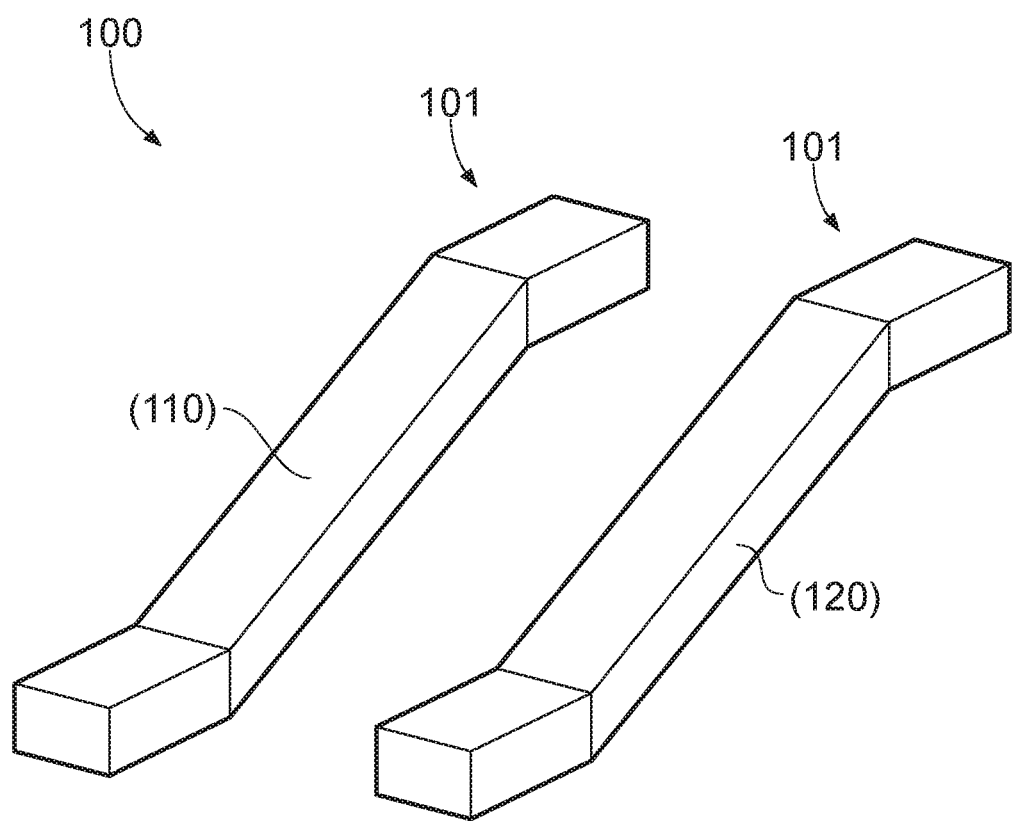
FIG. 1A illustrates a hazardous environment comprising side by side escalators where work is to be carried out and FIG. 1B illustrates an escalator of FIG. 1A.

FIG. 1A illustrates an example of a location where certain embodiments of the present invention can be utilised. The environment 100 includes safe regions 110 and at least one dangerous or hazardous region 120. For example a dangerous region and environment can be the underside of a moving escalator where there are rapidly moving and heavy items of machinery.

Figure 1B:
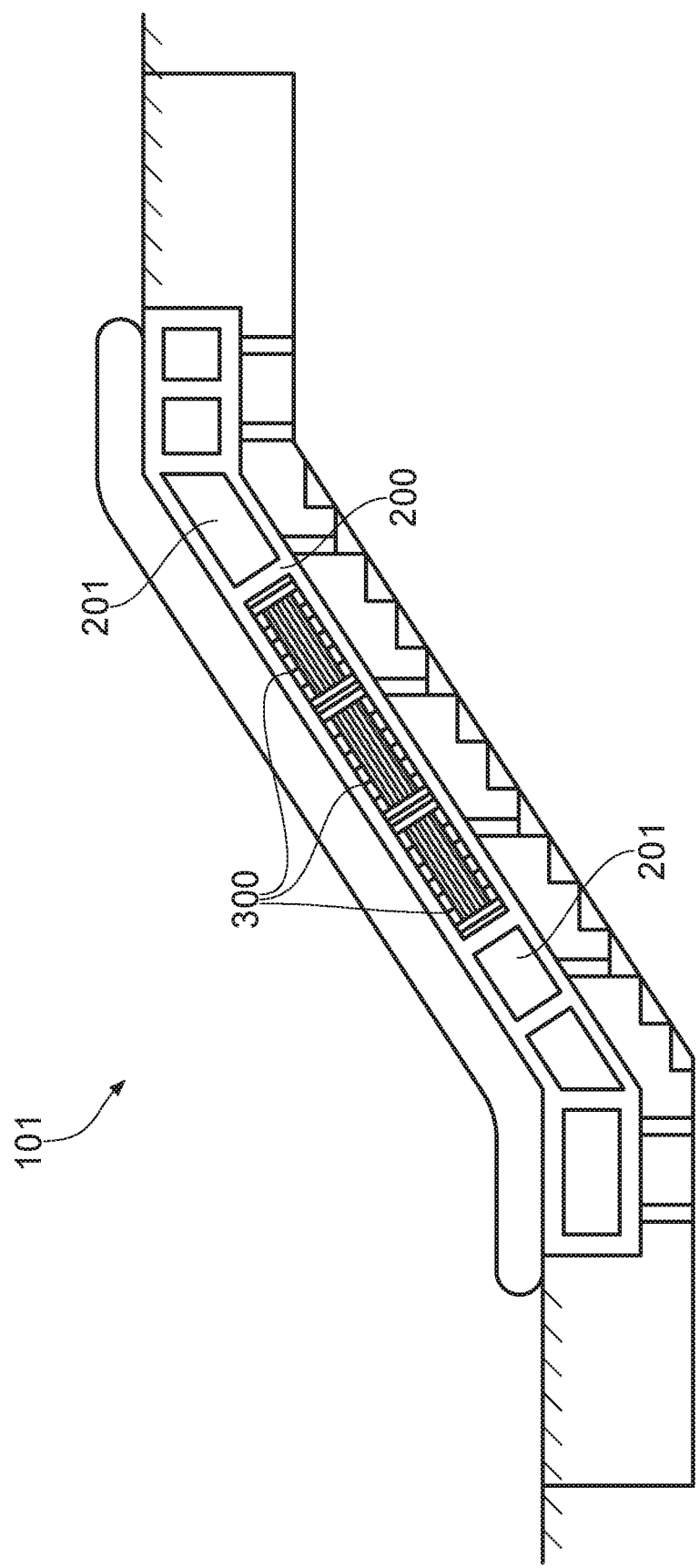

FIG. 1B illustrates an example of an escalator 101. The escalator 101 includes a support framework 200 comprising truss work provided under the escalator 101. The framework 200 is further illustrated in FIGS. 2A and 2B as discussed below.

Escalators are an example of heavy machinery that can be hazardous. Typically, two or more escalators are arranged close to each other in a substantially side-by-side arrangement for example as illustrated in FIG. 1A. Typically one escalator is an up escalator and one is a down escalator. Certain embodiments of the present invention can be utilised to enable personnel such as human operators to shut down a defective escalator or an escalator that is due a maintenance check whilst adjacent escalators remain functioning.

Prior to maintenance of an emergency or non-emergency type being carried out in such a location an on-site survey is undertaken to determine risk and to determine a size or the sizes of safety barriers which are secured to the in situ equipment. The on-site survey identifies the shape and configuration of a support framework of any escalator adjacent to an escalator where emergency or non-emergency work must be carried out, and for each opening between struts of the framework a barrier member is sized and configured and thereafter installed. For example, where maintenance work is to be carried out on an escalator, in the escalator opposite where that work is to be carried out, a barrier system comprising a chainmail curtain or concertina door system is arranged and can be closed when desired. The barrier system can be designed, built and installed when an escalator is originally built or constructed or alternatively can be retro-fitted as and when a problem occurs with any particular escalator which is close to adjacent escalators.

A chainmail curtain (or chainmail web/mesh) is thus an example of a barrier member. It will be appreciated that certain embodiments of the present invention are not limited to the use of chainmail curtains. Rather, any flexible or foldable configuration of at least one element that can be stored when not needed in a folded-up or gathered together arrangement and then subsequently deployed by drawing the element into a stretched, unfolded and/or extended configuration can be utilised.

Aptly, the barrier elements forming the barrier member are fireproof and/or heat resistant and/or rust-proof and/or resilient to the extent that when closed to secure a barrier member over an opening in the support framework, a human being or part of a human being, is prevented from moving into a hazardous region of machinery. The hazardous region of the machinery is a region which is still in operation when the human operator is working on adjacent equipment which is switched off.

The on-site survey thus determines safety mesh panel sizes along with tensioned wire rope framing measurements. Such measurements are thereafter utilised to design and manufacture a safety curtain which is readily affixable and locatable to the environment where it can be repeatedly and replaceably secured to the in situ parts of machinery so that work can commence in a safe manner.

An escalator framework 200 may be formed of an interconnected network of struts and trusses, having side regions which are open between trusses, and spaced apart sides are parallel, as are spaced apart upper and lower surfaces.

Figures 2A, 2B:
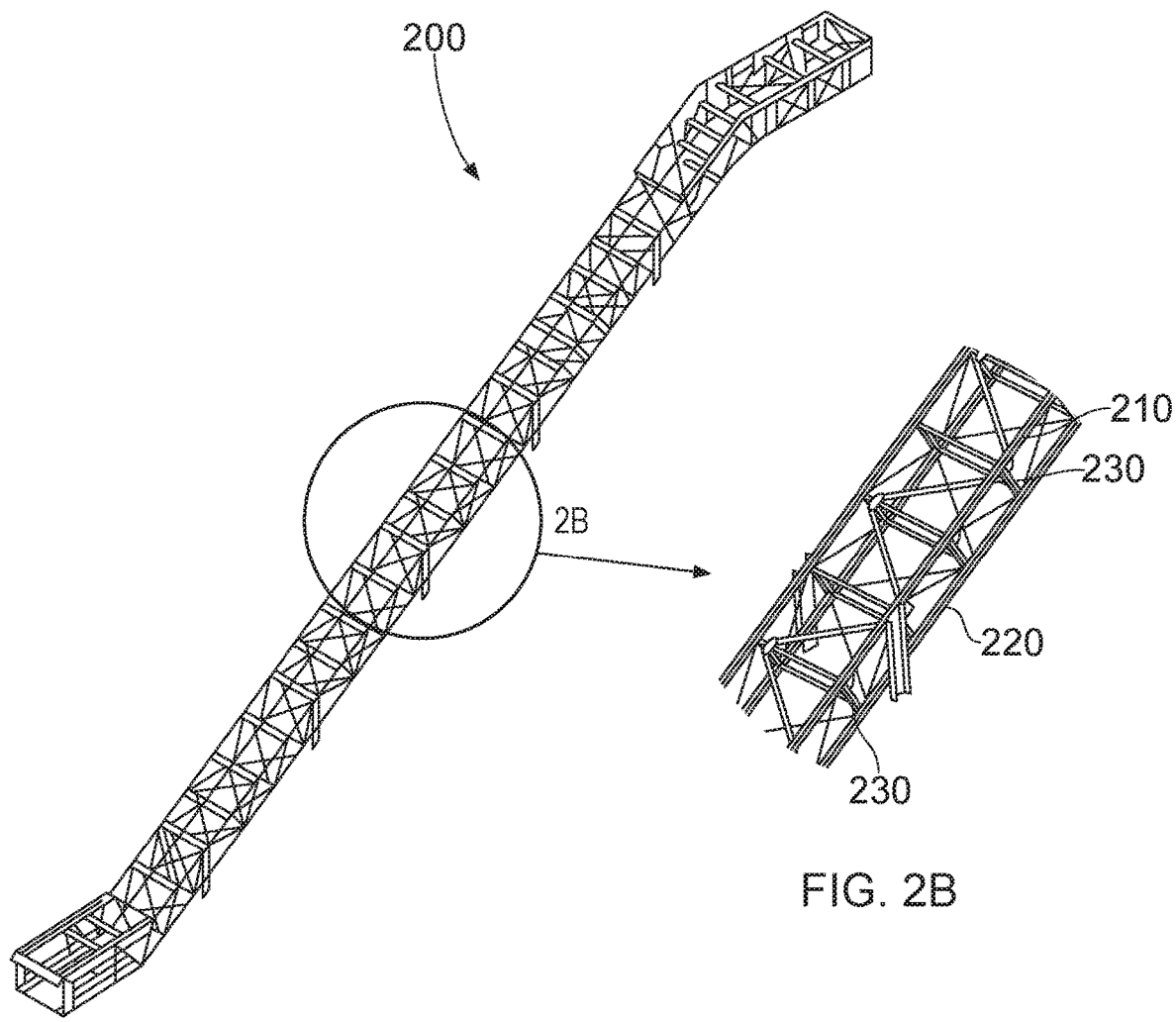
FIGS. 2A and 2B illustrate escalator framework comprising truss work.
Figure 3:
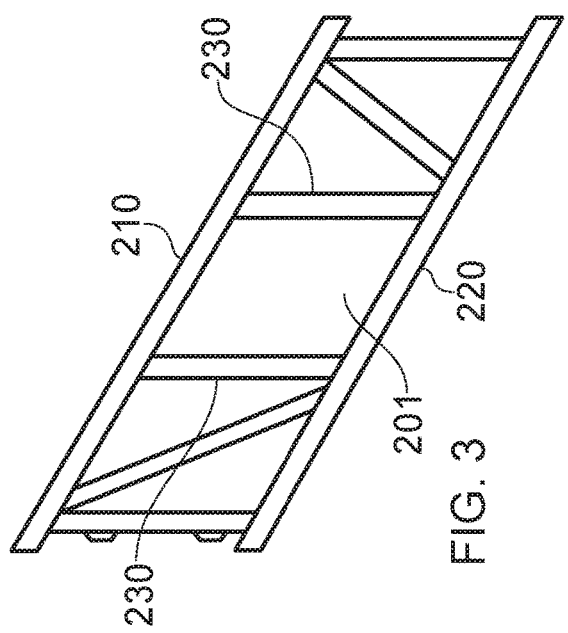
FIG. 3 illustrates a region of framework.

Referring to FIGS. 2B and 3, an upper cross beam 210 of the escalator framework 200 is substantially parallel to but spaced apart from a lower cross beam 220. Struts 230 extend across between the upper cross beam 210 and the lower cross beam 220.

The framework 200 has one or more openings 201, for example as defined between two side struts 230, the lower cross beam 220, and the upper cross beam 210.

Figure 4A:
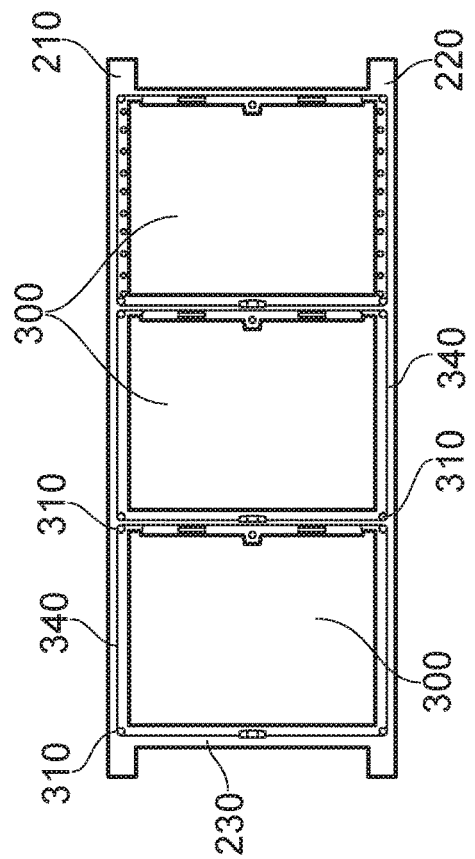
FIGS. 4A to 4C illustrate a region of truss work after fitting of safety curtain barrier members.
Figure 4C:
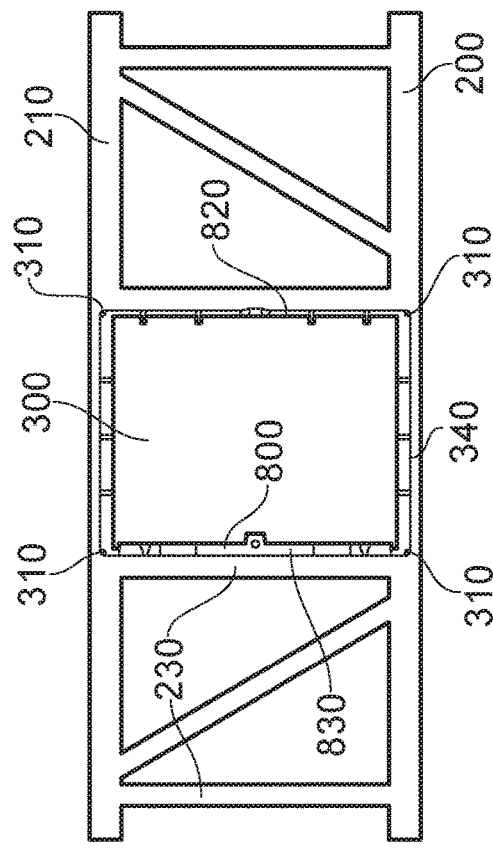
Figure 4B:
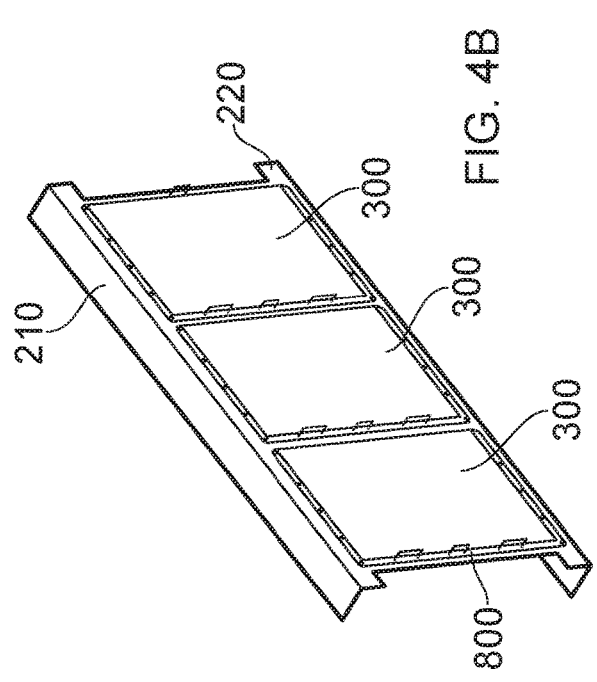
Figure 4D:
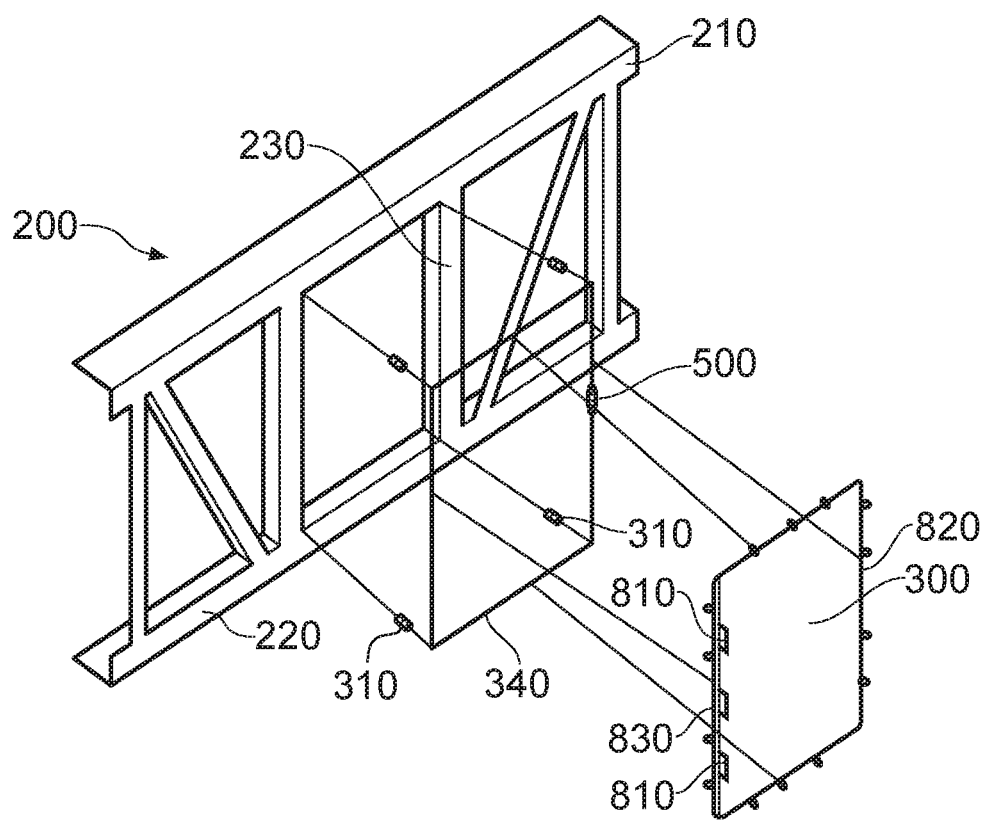
FIG. 4D is an exploded view corresponding to FIG. 4C.

As illustrated in FIGS. 4A to 4D, a barrier member comprises one or more extendable barrier elements; barrier elements comprise, for example, panels 300. The panel(s) 300 are fitted over one or more of the openings 201, such that the barrier member acts as a safety barrier during maintenance of the escalator 101. FIGS. 4A and 4B show a barrier member comprising three panels 300; FIGS. 4C and 4D shows a barrier member comprising one panel 300. (FIG. 4D illustrates an exploded view of the panel 300 and framework 200 of FIG. 4C).

Figure 9:
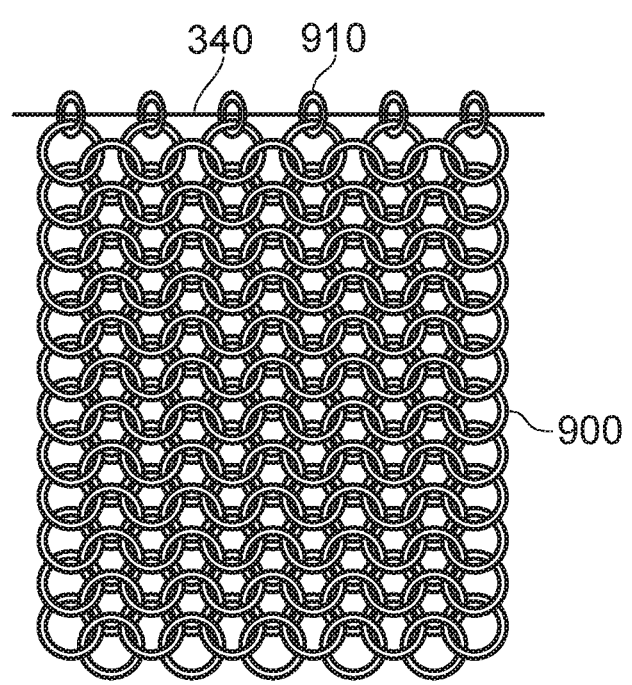
FIG. 9 is a front view of a chainmail curtain.
Figure 10A:
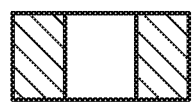
FIG. 10A is a cross-sectional view of a dowel spacer piece.
Figure 10C:
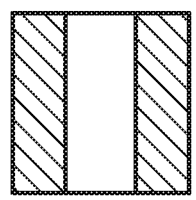
FIG. 10C is a cross-sectional view of an alternative dowel spacer piece.
Figure 10B:
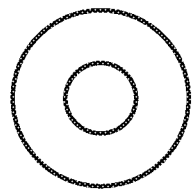
FIG. 10B is an end view of the dowel spacer piece of FIG. 10A.
Figure 10D:
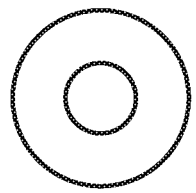
FIG. 10D is an end view of the dowel spacer piece of FIG. 10C.

The barrier member may comprise one or more fireproof rigid elements. The panel 300 may be formed of chainmail 900, as illustrated in FIG. 9.

The panel 300 is secured in a slidable arrangement to a tensioned wire rope 340 that extends around the opening 201 in the support framework 200. The panel 300 is extendable across the opening 201, i.e. the panel can be pulled from an open position, in which the opening 201 is accessible, across the opening 201, to a closed position, in which the opening is not accessible. The operation of the safety barrier is explained in greater detail below.

Manufacture of a chainmail panel 300 can be achieved using a wire weave machine. The weave has, for example, a 5 mm opening size interwoven in a vertical and horizontal plane using, for example, a 1.2 mm stainless steel wire.

Panels 300 are manufactured to specific dimensions as stated above and are bespoke to each escalator truss and opening. This includes standard fixed as well as moveable and bespoke special irregular shaped panels.

Aptly the four sides of the chainmail panel 300 are reinforced with a stainless steel perimeter wire rope 340 threaded through the entire length and width of the panel 300 at a standard dimension inwards in from all edges; these are crimp terminated at each corner.

FIG. 9 illustrates a chainmail curtain in a closed configuration. The chainmail curtain hangs from multiple screw locking carabiners clips 910 a top section of the wire rope 340.

Certain embodiments of the barrier member of the present invention can be secured directly to the extant, conventionally provided, framework 200 for an escalator 101. This is achieved by securing, via welding or screwing or other securing mechanism, support elements comprising wire supports 310. Wire supports 310 may for example comprise stud/dowel/peg elements, and are located at appropriate positions to the support framework 200 of the escalator 101, thereby to enable a wire frame to be formed. For example, wire supports 310 may be provided at the corners, and may also be provided at positions between the corners.

It will be appreciated that alternatively a separate framework, in many ways similar to a window frame arrangement, can be pre-prepared having dimensions to fit the specific escalator framework and then that panel system secured by welding or screwing or bolting or the like to the escalator framework.

Figure 6A:
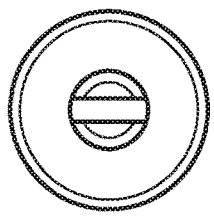
FIG. 6A is an end view of a wire support and threaded dowel.
Figure 6B:
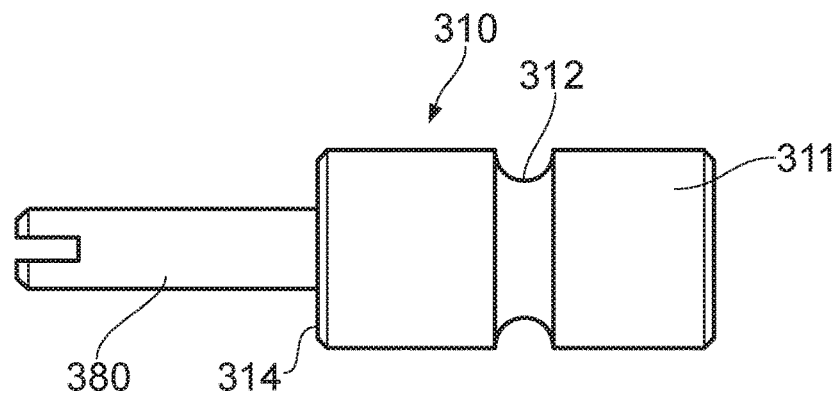
FIG. 6B is a side view of the wire support and threaded dowel of FIG. 6A.
Figure 6C:
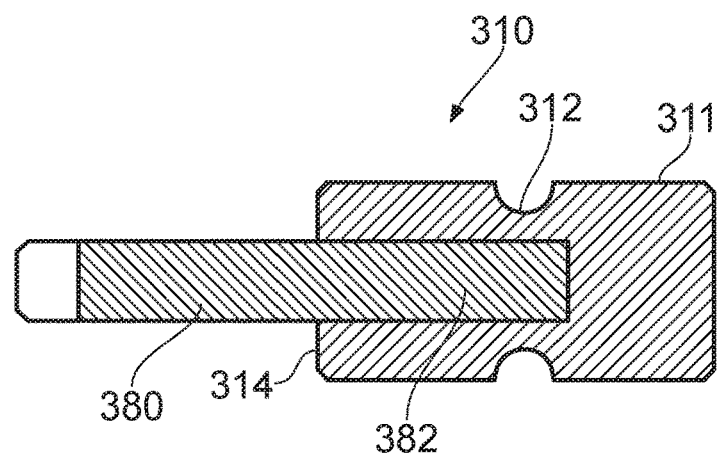
FIG. 6C is a longitudinal cross-sectional view of the wire support and threaded dowel of FIG. 6A.
Figure 6D:
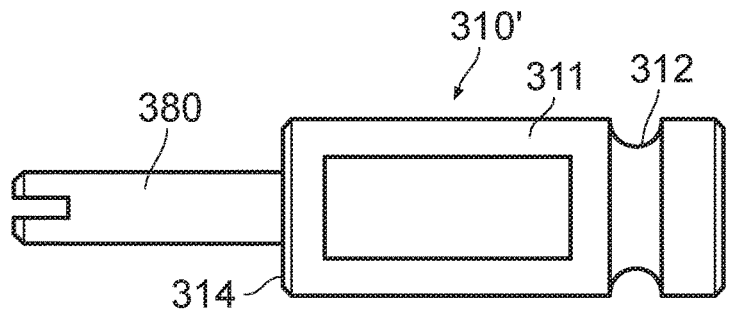
FIG. 6D is a side view of an alternative embodiment of wire support and threaded dowel.
Figure 6E:
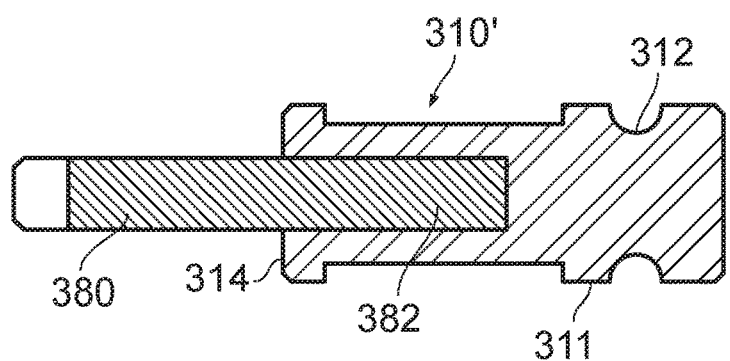
FIG. 6E is a longitudinal cross-sectional view of the wire support and threaded dowel of FIG. 6D.

A wire support 310 is shown in greater detail in FIGS. 6A to 6C. An alternative embodiment of a wire support 310' is shown in FIGS. 6D and 6E.

A groove 312 is provided in an outer surface 311 of the wire support 310, to accommodate the wire rope 340. The groove 312 is provided at a predetermined distance away from an end 314 of the wire support closest to the framework, such that when the wire rope 340 is supported in the grooves 312 of the wire supports 310, the frame provided by the wire rope 340 is situated at a predetermined distance D away from the support framework 200, thereby enabling the panel 300, for example the chainmail 900 forming a panel 300, to move freely.

The wire supports 310 are manufactured to suit site conditions in length, thereby enabling the wire support 310 to clear any mounted obstruction present on the existing truss framework 200. Aptly the material of the wire support 310 is stainless steel bar.

The wire support 310 is machined, and the groove 312 is machined around the full circumference of the wire support 310. The groove 312 is sized to suit the wire rope 340 to be held in the groove 312.

Figure 11A:
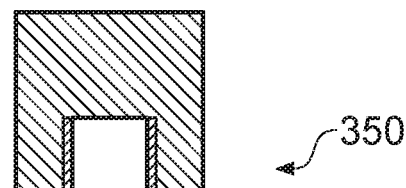
FIG. 11A is a cross-sectional view of a stud stand.
Figure 11B:
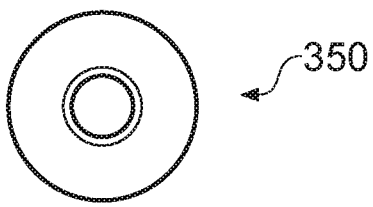
FIG. 11B is an end view of the stud stand of FIG. 11A.
Figure 14B:
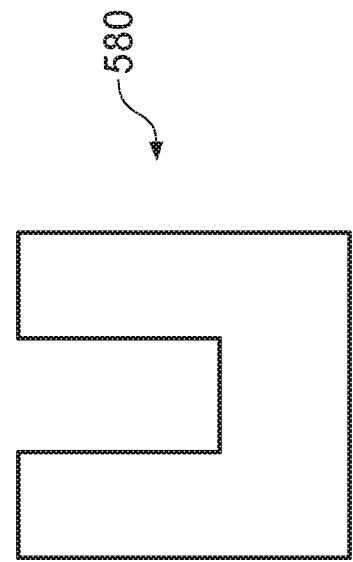
FIGS. 14B to 14E are front, back and side views of the mounting offset block of FIG. 14A.
Figure 14A:
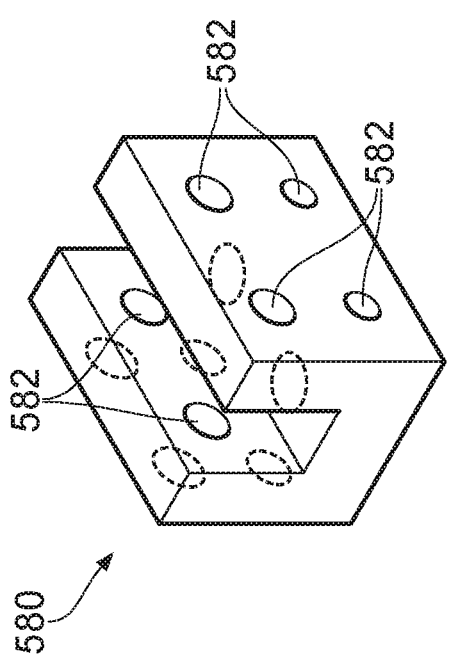
FIG. 14A is an isometric view of a mounting offset block.
Figure 14E:
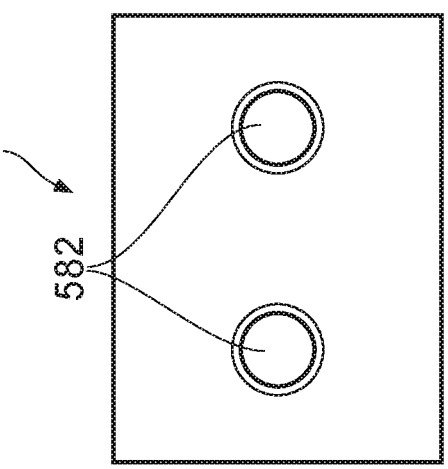
Figure 14D:
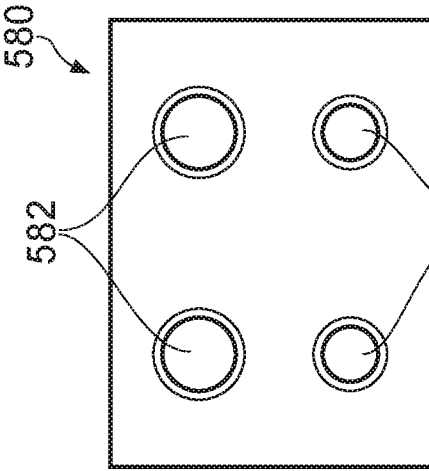
Figure 14C:
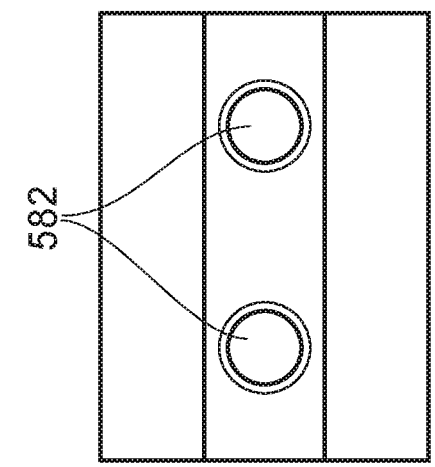

Coupling means, comprising stud stands 350 (as illustrated in FIGS. 11A and 11B) and threaded dowels 380 are provided to couple the wire supports 310 to the framework 200. Stud stands 350 are welded onto the framework 200, and a threaded dowel 380 can be screwed into each stud stand 350 such that a portion of the threaded dowel 380 projects clear of the stud stand 350. A wire support 310 can then be screwed onto the projecting end 382 of each threaded dowel 380.

Figure 5A:
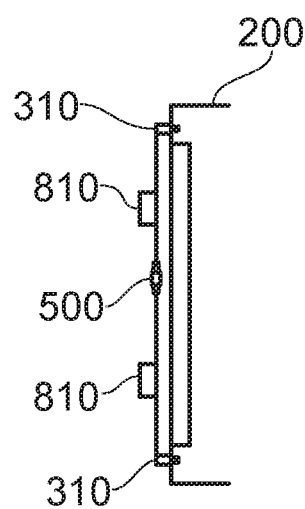
FIGS. 5A and 5B are side views of a barrier element fitted to a section of framework.
Figure 5B:
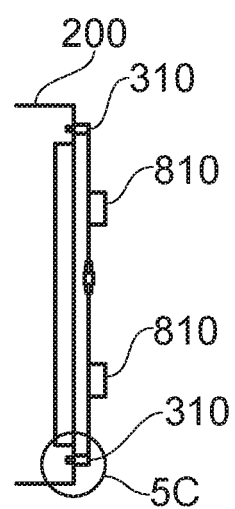
Figure 5C:
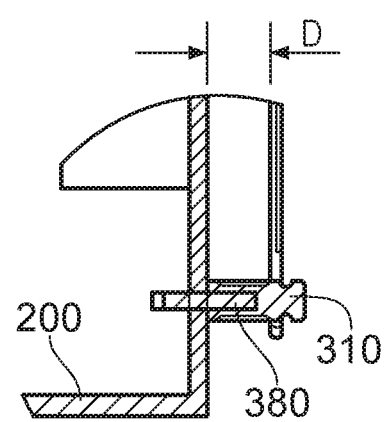
FIG. 5C is a cross-sectional, detailed view of the area indicated on FIG. 5B.

FIG. 5C is a cross-sectional partial view of a panel 300 after assembly onto the support framework 200, and illustrates how the tensioned wire rope 340 is held a predetermined distance D away from the support framework 200 by the wire supports 310.

In addition to the wire supports 310, various offset components can be used, to increase the separation of a panel 300 from the support framework 200, which could be useful for example to ensure that a symmetrical wire rope framing is achieved. An example of an offset component is a mounting offset block 580 as illustrated in FIGS. 14A to E. The alternative mounting offset block 580', as illustrated in FIGS. 15A and 15B, provides in a greater separation of a panel 300 from the support framework 200 than that illustrated in FIGS. 14A to E. The mounting offset block 580/580' can be mounted to the support framework 200, for example by screws (not shown) inserted through apertures 582. The mounting offset block 580/580' is mounted such that it is positioned between the support framework 200 and the wire support 310. In such an embodiment, an additional mounting element is provided, to receive the threaded dowel 380 of the wire support 310. The additional mounting element could comprise a mounting plate 590 as illustrated in FIGS. 16A and 16B, or 590' as illustrated in FIGS. 17A and 17B. The mounting plate 590/590' is be provided with multiple apertures 592; the threaded dowel 380 of the wire support 310 can be inserted into any one of the apertures 592, to couple the panel 300 to the support framework 200. The provision of multiple apertures provides flexibility in the positioning of the wire supports 310.

Figure 18A:
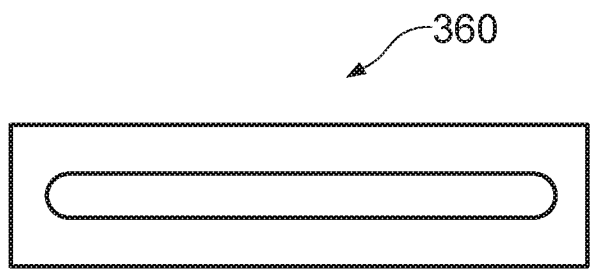
FIG. 18A is a top view of a slotted adjustment bar.
Figure 18B:
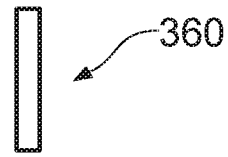
FIG. 18B is an end view of the slotted adjustment bar of FIG. 18A.
Figure 18C:
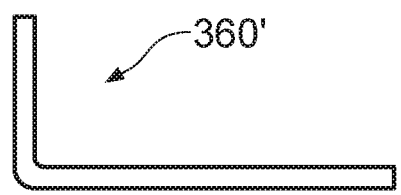
FIG. 18C is a side view of an angled slotted adjustment bar.
Figure 18D:
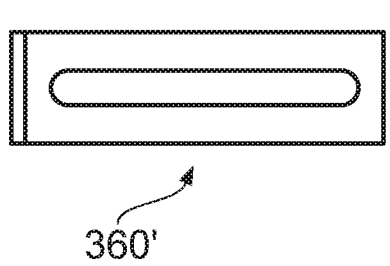
FIG. 18D is an top view of the angled slotted adjustment bar of FIG. 18C.
Figure 18E:
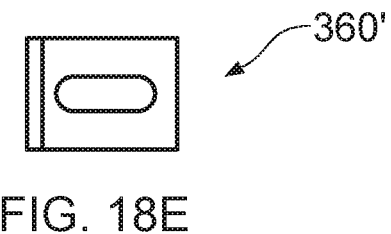
FIG. 18E is an end view of the slotted adjustment bar of FIG. 18C.
Figure 19C:
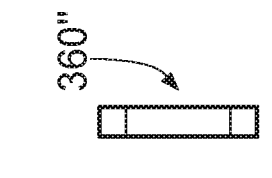
FIG. 19C is an end view of the slotted adjustment bar of FIG. 19A.
Figure 19B:
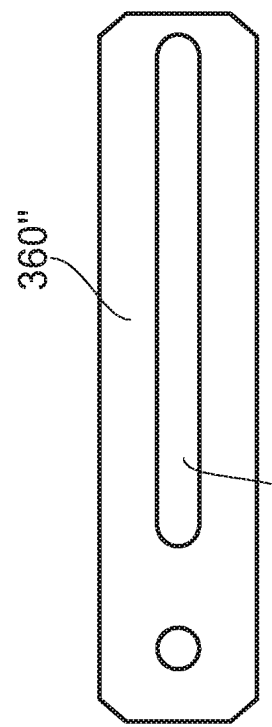
FIG. 19B is a top view of the slotted adjustment bar of FIG. 19A.
Figure 20B:
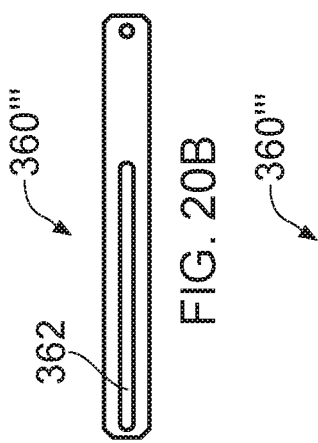
FIG. 20B is a top view of the slotted adjustment bar of FIG. 20A.
Figure 20C:
FIG. 20C is a side view of the slotted adjustment bar of FIG. 20A.
Figure 19A:
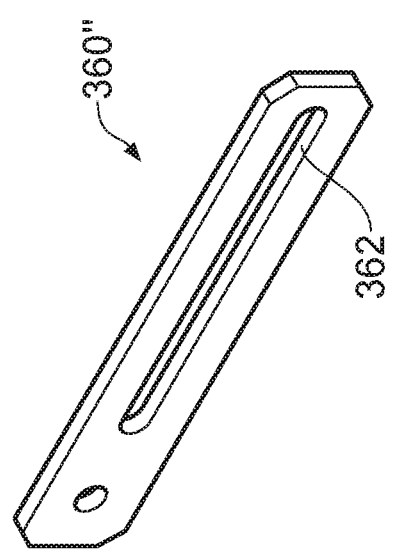
FIG. 19A is an isometric view of an alternative slotted adjustment bar.
Figure 20A:
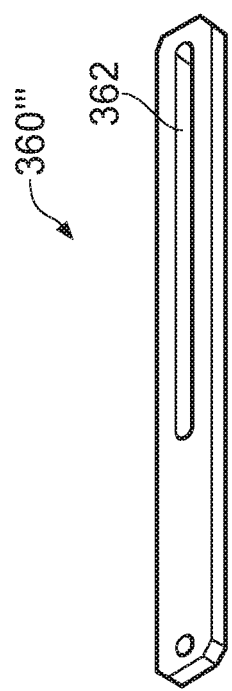
FIG. 20A is an isometric view of a further alternative slotted adjustment bar.

As an alternative to the mounting plate 590, a slotted adjustment bar 360, as illustrated in FIG. 18A, or angled slotted adjustment bar 360' as illustrated in FIG. 18B may be used. Further alternative slotted adjustment bars 360" and 360''' are illustrated in FIGS. 19A to 20B. The slotted adjustment bar 360/360'/360"/360''' is provided with an elongated slot 362, in which a threaded dowel 380 of the wire support 310 can be received. The elongated slot 362 therefore provides flexibility in the positioning of the wire supports 310.

Furthermore, in additional or by way of alternative to the offset components described above, dowel spacer pieces 370/370' (as illustrated in FIGS. 10A to 10D), can be used to increase the separation of the wire rope 340 frame from the framework 200.

If one or more dowel spacer pieces 370/370' are to be used, they are threaded onto the projecting end 382 of the threaded dowel 380 before the wire support 310, such that the dowel spacer piece(s) 370/370' are located between the wire support 310 and the framework 200.

FIG. 5C illustrates a separation distance D of the panel 300 from the support framework 200. If one or more dowel spacer pieces 370/370' are used, the distance D is increased by the length of the dowel spacer pieces 370/370'. A variety of different length dowel spacer pieces 370 can be threaded onto the threaded dowel 380 to achieve the desired offset measurement, i.e. desired distance D. Furthermore distance D can be increased by the offset components as described above.

Figure 7A:
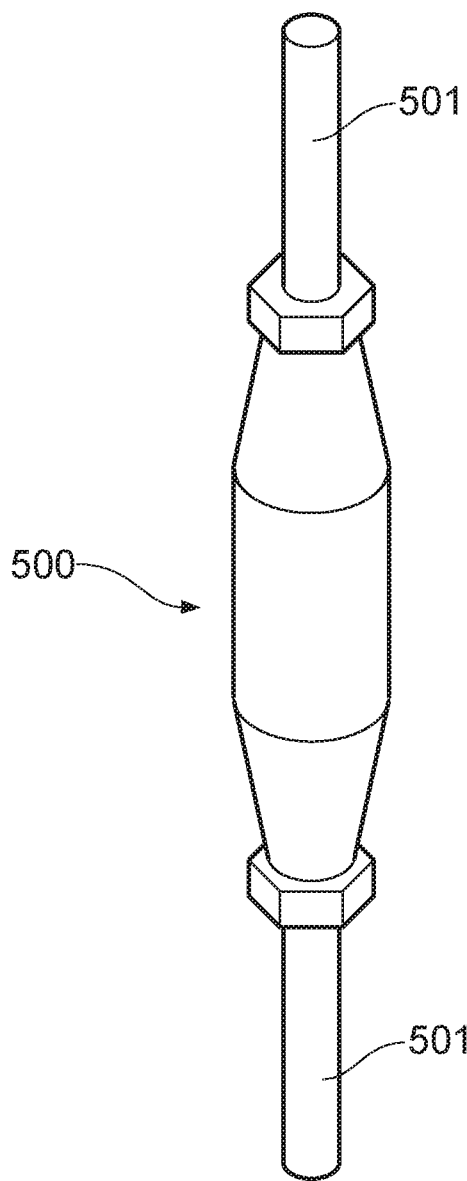
FIG. 7A is an isometric view of a tensioning element and attachment studs and FIG. 7B is a longitudinal cross-sectional view of the tensioning element and attachment studs of FIG. 7A.
Figure 7B:
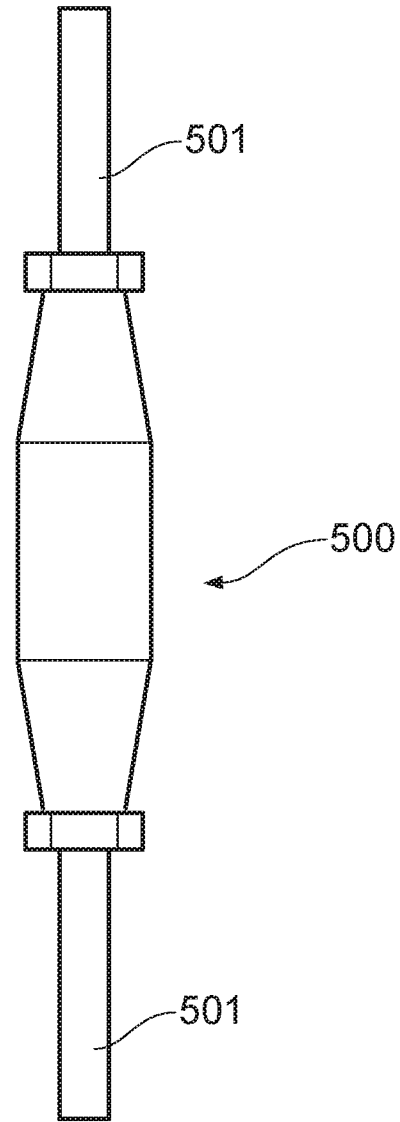

The wire rope 340 can be tensioned using a tensioning element such as a turnbuckle 500. The turnbuckle 500 may be made of stainless steel, and may be attached to the wire rope 340 by a suitable wire attachment means, such as swaged studs or unswaged studs 501. FIGS. 7A and 7B illustrate a turnbuckle 500 and wire attachment means comprising studs 501.

Stainless steel wire rope 340 is cut to a pre-measured length and the attachment studs 501 are then hydraulically swaged on to the ends of the wire rope 340. The tensioning turnbuckle 500 is then fitted to the assembly between the studs 501 ready for site mounting.

As an alternative to the turnbuckle 500, a clutched tensioning unit could be used, such a commercially available Gripple™ clutched tensioning unit. The clutched tensioning unit is installed in the same position as the turnbuckle 500 as described above. In this embodiment, the wire attachment means comprises apertures in the clutched tensioning unit which receive and grip the ends of the wire rope 340. The wire rope 340 is initially tensioned by hand, and subsequently, a pre-set hydraulic tensioning tool is inserted into a tool aperture and turned, to further tension the wire rope frame to a desired tension.

Figure 8D:
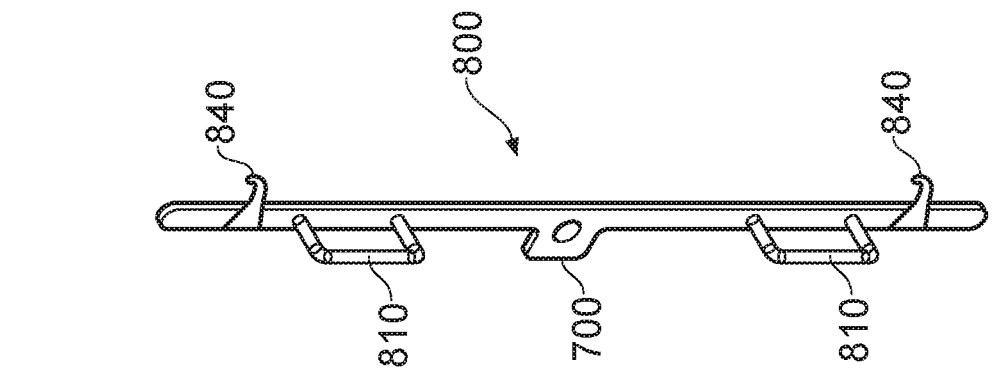
FIG. 8D is an isometric view of the end panel of FIGS. 8A to 8C.
Figure 8C:
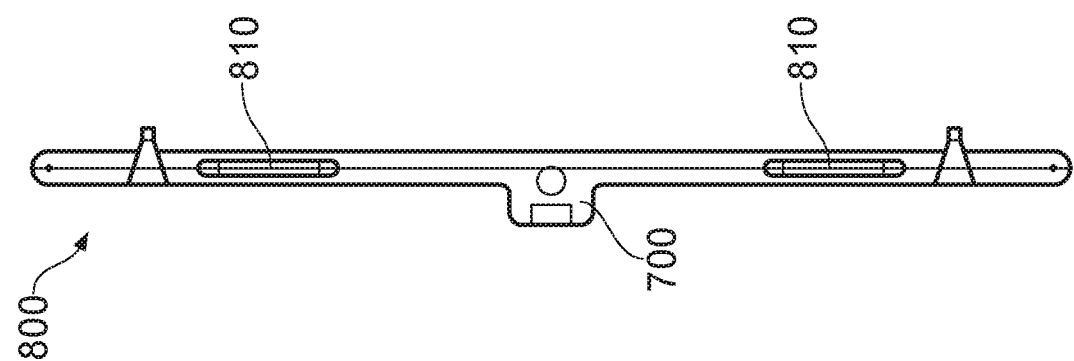
FIGS. 8A and 8C are side views of an end panel.
Figure 8B:
FIG. 8B is a front view of the end panel of FIGS. 8A and 8C.
Figure 8A:
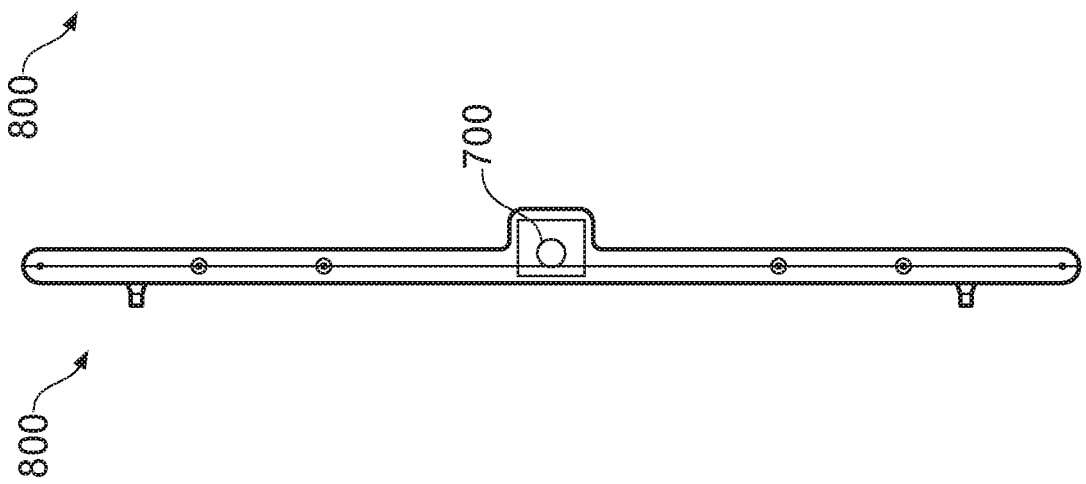
Figures 8E, 8F:
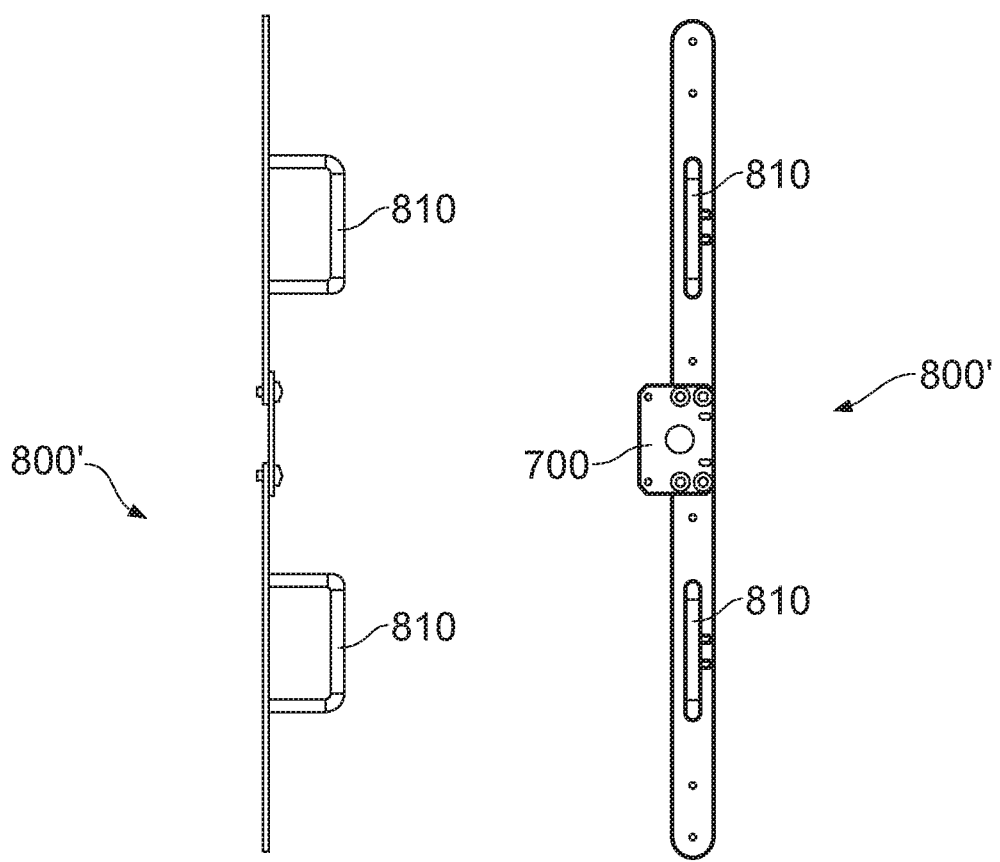
FIG. 8E is front view of an alternative end panel.
FIG. 8F is a side view of the end panel of FIG. 8F.

Each panel 300 has a fixed end 820, and a moveable end 830 (indicated on FIGS. 4C and 4D). A pull bar 800 (as illustrated in greater detail in FIGS. 8A to 8D, and in an alternative embodiment 800' in FIGS. 8E and 8F), comprising an elongate end panel or end plate, is provided at the moveable end 830, for pulling the panel across the opening 201, as explained in greater detail below.

The pull bar 800 includes two handles 810, which may be stainless steel, to which the chainmail curtain/panel 300 is secured. This enables the chainmail curtain to be moved from a storage mode/open position, in which the curtain is folded or collapsed together at one end of a respective opening 201 in a framework 200, by a user, using the handles 810 to slide the chainmail curtain along the tight wire rope 340, into a closed position, thereby closing the opening 201 between the framework 200 of the escalator 101, to thereby isolate a safe work space. Purpose made hooks 840 or clips, or other securing mechanisms can be utilised on the end plate so that when it is drawn across the full extent of the opening 201 it will engage with cooperating elements of the framework 200 to help lock the curtain in a closed configuration. Hooks 840 such as those illustrated in FIGS. 12A to 12C could be fixed to the pull bar 800, for example, at three equidistance locations. These hooks 840 register around the wire rope framing 340 and retain the chainmail panel 300 in position. The centrally positioned hook enables the locking cam 700 (for example as illustrated in FIGS. 13A and 13B) to engage with it to form a releasable locking-off mechanism. The hooks 840 may be mounted on a slotted fixing hole of the pull bar 800, thereby enabling some slight adjustment for tensioning each individual panel 300.

The pull bar 800 is manufactured to suit each bespoke chainmail curtain, as these vary in depth. Aptly the pull bar 800 is manufactured from stainless steel plate and is laser cut to exact dimensions, and includes fixing holes and handle mounting holes, and has provision for a locking cam lock 700. Aptly, safety advisory stickers are placed on the pull bar 800 advising of importance to relock cam lock 700 once returned to its resting position and also the danger of opening which the escalator is in operation. Also affixed to the pull bar 800 is an ID engraved plate, which identifies the location of the panel 300 by denoting a station/escalator and position on the escalator truss work.

Assembly

Panel Curtain

Once all elements of the safety barrier element are manufactured, they can be assembled to form a component set. Every element for each barrier element can be identified and tagged so as to form a set of components as each panel and its location are bespoke in measurement terms.

The pull bar 800 is mounted on the appropriate mesh/chainmail curtain end using pre-drilled mounting holes and screwed retaining lugs positioned on the rear face of the plate.

The screw locking carabiner clips 910 are inserted through the opposite end to the pull bar 800 and the top and bottom lengths of the panel at equidistance to each other. The carabiner clips 910 are threaded through the mesh of the chainmail 900 and behind the small diameter stainless steel tensioning wire rope 340 threaded along the full length and side of the panel edges.

Framing Wire Rope

Once the site measurement has determined the exact length the framing wire rope 340 needs to be, this can be cut to size and the attachment studs 501 hydraulically swaged onto the ends of the wire rope 340.

Fitting the turnbuckle 500 between the attachment studs 501 (or inserting the ends of the wire rope 340 into a clutched tensioning unit) completes the framing wire rope assembly. All items are tagged to identify which panel and location they belong.

Installation

Framing Studs/Wire Supports

The escalator truss work is measured and the position of corner framing studs/wire supports 310 is clearly marked on the truss framework. These can be checked that they form a symmetrical frame for its full perimeter.

To ensure a symmetrical wire rope framing is formed, offset components can be mounted between the wire supports and the support framework.

Stud stands 350 are welded to the escalator framework 200 in the desired positions, forming the symmetrical shape of the overall frame. Threaded dowels 380 of the necessary length to enable the end corner wire supports 310 to be clear of apparatus and obstacles are then screwed into the stud stands 350.

If necessary, to facilitate the symmetrical offset distance D from the framework 200 to avoid apparatus and other obstacles, dowel spacer pieces 370/370' are threaded onto the projecting end 382 of the threaded dowels 380, and/or one or more offset components are inserted between the wire supports 310 and the support framework 200, to achieve the desired offset measured.

A wire support 310 is finally screwed onto the last portion of the projecting end 382 of the threaded dowel 380.

Wire Rope Framing

The pre-measured and manufactured wire rope assembly (comprising the wire rope 340, turnbuckle 500 and attachment studs 501, or the wire rope 340 and the clutched tensioning unit), is mounted around the corner framing studs/wire supports 310.

The wire rope assembly is mounted such that the tensioning turnbuckle 500/clutched tensioning unit is mounted to the opposite end to the end pull bar 800 position and vertically central. Once the wire rope assembly has been positioned loosely, the turnbuckle 500/clutched tensioning unit is then tensioned using the appropriate tensioning tool, thereby to tension the wire rope.

Safety Curtain Hanging

When the tensioned framing is in position, the bespoke manufactured curtain panel 300 can now be hung in place. Using the lockable carabiner clips 910 already installed on the curtain, the panel 300 is mounted top/bottom and the non-plated fixed end 820.

Once completed, the pull bar assembly 800 can be engaged to the tensioned wire rope frame using the integral engagement hooks 840 and then using an appropriate key, the locking cam lock 700 can be locked into position.

Operational Use

When installed, the safety curtain provides a safe barrier in front of the working escalator. The installation of these panels in no way negates any strict protocol which relates to gaining certified access to this restricted area.

To open the closed safety curtain the operator must possess the appropriate paperwork and the required key to open the fixed pull bar 800. Once opened, the pull bar 800 is used to slide the curtain along its wire rope framing 340 to the other end of the opening 201 where it can be retained by engaging suitable pull bar attachment means.

Once work is completed the pull bar attachment means are disengaged and the panel is slid back to its fully stored position, and the pull bar 800 is re-engaged and locked off.

Certain embodiments of the present invention thus provide a safe working environment in between escalators or other such heavy machinery. Certain embodiments of the present invention can provide alternative machinery guarding. Certain embodiments of the present invention provide instant easy access to escalators and machinery for repairs and maintenance.

Certain embodiments of the present invention avoid the need for laborious dismantling and re-mounting of conventional safety barrier systems. Certain embodiments of the present invention provide a convenient and safe barrier to enable access to heavy machinery parts for cleaning and maintenance purposes. Certain embodiments of the present invention provide a quick and easy to replace panel system to provide a safety curtain. Certain embodiments of the present invention provide a guarding system which is far more flexible than is currently available with conventional guarding systems. Certain embodiments of the present invention are not restricted to use with escalators but rather are more broadly applicable to be used wherever a region of walling or framework that includes through openings must be closed off in a secure manner to permit maintenance operations in adjacent regions.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The invention claimed is:

1. An apparatus for providing a safety barrier proximate to a hazardous region, the apparatus comprising:
an extendable barrier member slidable on at least one support element, the at least one support element comprising a wire rope supported in a groove provided in each of a plurality of wire supports;
wherein the groove is provided on an outer surface of each of the plurality of wire supports;
wherein the groove is machined around a circumference of each of the plurality of wire supports;
wherein the at least one support element is securable to a support framework proximate to the hazardous region; and
wherein the extendable barrier member is movable between a closed position and an open position and wherein, in the closed position, the extendable barrier member provides a barrier over a respective opening of the support framework.

2. The apparatus as claimed in claim 1, wherein the extendable barrier member comprises a web of chainmail.

3. The apparatus as claimed in claim 1, wherein the wire rope comprises a pre-measured length of wire rope having a first end and a second end, and further wherein each end of the pre-measured length of wire rope is attached by wire attachment means to a respective tensioning element.

4. The apparatus as claimed in claim 3, wherein the wire attachment means comprises a plurality of attachment studs and the tensioning element comprises a turnbuckle.

5. The apparatus as claimed in claim 1, further comprising a pull bar attached to a moveable end of the extendable barrier member.

6. The apparatus as claimed in claim 5, wherein the pull bar further comprises pull bar attachment means to attach the pull bar to the support framework when the extendable barrier member is in the closed position.

7. The apparatus as claimed in claim 6, wherein the pull bar attachment means comprises hooks or clips which are engageable with cooperating elements of the support framework to maintain the extendable barrier member in the closed position.

8. The apparatus of claim 5, wherein the pull bar further comprises handles that project orthogonally from the pull bar and the extendable barrier member to facilitate opening and closing of the extendable barrier member.

9. The apparatus of claim 5, wherein the pull bar further comprises one or more hooks that releasably couple the extendable barrier member to the wire rope to hold the extendable barrier member in the closed position, and wherein the pull bar further comprises a cam lock that releasably locks the extendable barrier member in the closed position.

10. The apparatus of claim 1, further comprising the plurality of wire supports, wherein the plurality of wire supports comprise stud stands and threaded dowels.

11. The apparatus of claim 10, wherein the stud stands are welded onto the support framework, and wherein the threaded dowels are partially screwed into the stud stands such that the groove is not inserted into the stud stands and projects clear of the stud stands.

12. The apparatus of claim 10, further comprising a mounting plate positioned between the support framework and the plurality of wire supports, wherein the mounting plate is coupled to the support framework and wherein the mounting plate includes apertures for receiving the threaded dowels.

13. The apparatus of claim 10, further comprising a slotted adjustment bar positioned between the support framework and the plurality of wire supports, wherein the slotted adjustment bar is coupled to the support framework, and wherein the slotted adjustment bar comprises an elongated slot for receiving the threaded dowels, wherein the positioning of the threaded dowels is adjustable along a length of the elongated slot.

14. The apparatus of claim 1, further comprising one or more spacers positioned between the plurality of wire supports and the support framework to increase the distance between the support framework and the extendable barrier member.

15. An apparatus for providing a safety barrier proximate to a hazardous region, the apparatus comprising:
an extendable barrier member slidable on at least one support element;
the at least one support element comprising a wire rope supported in a groove provided in each of a plurality of wire supports;
wherein the groove is provided on an outer surface of each of the plurality of wire supports;
wherein the groove is machined around a circumference of each of the plurality of wire supports;
the at least one support element being securable to a support framework proximate to the hazardous region; wherein
the extendable barrier member is movable between a closed position and an open position and wherein, in the closed position, the extendable barrier member provides a barrier over a respective opening of the support framework; and
a pull bar attached to a moveable end of the extendable barrier member, and a locking means configured to releasably lock the pull bar in position.

16. An apparatus for providing a safety barrier proximate to a hazardous region, the apparatus comprising:
an extendable barrier member slidable on at least one support element;
the at least one support element comprising a wire rope supported in a groove provided in each of a plurality of wire supports;
wherein the groove is provided on an outer surface of each of the plurality of wire supports;
wherein the groove is machined around a circumference of each of the plurality of wire supports;
the at least one support element being securable to a support framework proximate to the hazardous region;
the extendable barrier member is movable between a closed position and an open position, and wherein in the closed position, the extendable barrier member provides a barrier over a respective opening of the support framework; and
a plurality of lockable carabiner clips that suspend the extendable barrier member from a wire rope.

* * * * *